Patented July 28, 1942

2,291,194

UNITED STATES PATENT OFFICE 2,291,194

INSECTICIDE

Lloyd E. Smith, Washington, D. C., assignor to Henry A. Wallace, Secretary of Agriculture of the United States of America and his successors in office No Drawing. Application May 9, 1938, Serial No. 206,832

2 Claims. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

I have found that the class of organic compounds known as xanthydrols and derivatives thereof are effective in killing many species of insects whether applied externally or internally; that these organic compounds may be sprayed or dusted upon delicate vegetation without injuring it; that these materials are even more effective than lead arsenate and other commonly used insecticides and that they are relatively non-toxic to warm-blooded animals. This class of compounds may be represented by the general formula—

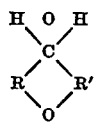

in which R and R' are benzene nuclei in each of which 2 adjacent carbon atoms take part in forming a six membered ring.

Some of the hydrogen atoms normally attached to R and R' may be substituted or replaced by alkyl, cycloalkyl, aryl, heterocyclic nuclei, or halogen, nitro, amino, hydroxy, alkoxy, or aryloxy groups.

These products may be reduced to impalpable powder by grinding and applied to vegetation either dry as a dust or wet as a spray. The products being soluble in refined mineral oils may be applied as a component of an oil emulsion spray. When applied as a spray in water it is desired to incorporate an effective wetting agent such as one of the so-called sulphonated oils. These products may also be applied by dissolving them in acetone and pouring the acetone into water whereupon a fine colloidal precipitate is formed. This may be applied directly to plants or may be combined with a suitable wetting agent and then sprayed.

As an example of the toxicity of this class of compounds it was found that—

(1) When tested against the tobacco horn worm at a concentration of one to 400 a 90% kill of this insect was obtained in 96 hours.

(2) When tested against mosquito larvae at a concentration of one part per 100,000 a 52% kill was obtained, and when tested at a concentration of one part in 50,000 a 94% kill was obtained.

(3) When tested against the southern army worm at a concentration of 120 micrograms per square centimeter the kill was 97% at the end of 48 hours.

Having thus described my invention what I claim for Letters Patent, is:

1. An insecticide containing as its essential active ingredient one of the class of compounds known as xanthydrols.

2. An insecticide containing as its essential active ingredient xanthydrol.

LLOYD E. SMITH.